(12) United States Patent
Patulak

(10) Patent No.: US 8,162,168 B1
(45) Date of Patent: Apr. 24, 2012

(54) MOTORCYCLE GAS TANK PROTECTING SYSTEM

(76) Inventor: Doreen W. Patulak, Auburn, MA (US)

( * ) Notice: Subject to any disclaimer, the term of this patent is extended or adjusted under 35 U.S.C. 154(b) by 230 days.

(21) Appl. No.: 12/536,633

(22) Filed: Aug. 6, 2009

(51) Int. Cl.
*B65D 25/20* (2006.01)

(52) U.S. Cl. .................................... 220/562; 220/731

(58) Field of Classification Search .............. 220/562, 220/563, 564, 730, 731, DIG. 21, 567.2
See application file for complete search history.

(56) References Cited

U.S. PATENT DOCUMENTS

| | | | |
|---|---|---|---|
| 2,467,001 A | 4/1949 | Allen | |
| 4,817,691 A | 4/1989 | Lau | |
| 5,195,566 A * | 3/1993 | Ott et al. | 141/312 |
| D425,842 S | 5/2000 | McNaughton | |
| 6,463,966 B1 | 10/2002 | Goodger | |
| 6,772,804 B1 | 8/2004 | Ryan | |
| 6,896,278 B1 * | 5/2005 | Hepburn | 280/304.3 |
| 6,987,209 B2 * | 1/2006 | Augustine et al. | 602/42 |
| 7,255,138 B2 | 8/2007 | Coffman | |
| 2005/0287048 A1 * | 12/2005 | Parkinson | 422/104 |
| 2007/0087089 A1 * | 4/2007 | Heymann et al. | 426/106 |

* cited by examiner

*Primary Examiner* — Stephen Castellano

(57) ABSTRACT

A motorcycle gas tank protecting system includes a fuel tank that has a fill opening surrounded by an outer wall. A flexible panel has a top side, a bottom side and a perimeter edge. The panel has an aperture extending therethrough that has a size corresponding to a size of the fill opening. The panel is removably positioned on the outer wall and the aperture and aligned with the fill opening to protect the outer wall from fuel when a fuel nozzle is extended through the aperture and into the fill opening.

1 Claim, 5 Drawing Sheets

MOTORCYCLE GAS TANK PROTECTING SYSTEM

BACKGROUND OF THE DISCLOSURE

Field of the Disclosure

The disclosure relates to fuel tank protecting devices and more particularly pertains to a new fuel tank protecting device for preventing damage to the paint and clear coat of a fuel tank due to fuel spillage on the fuel tank.

SUMMARY OF THE DISCLOSURE

An embodiment of the disclosure meets the needs presented above by generally comprising a fuel tank that has a fill opening surrounded by an outer wall. A flexible panel has a top side, a bottom side and a perimeter edge. The panel has an aperture extending therethrough that has a size corresponding to a size of the fill opening. The panel is removably positioned on the outer wall and the aperture and aligned with the fill opening to protect the outer wall from fuel when a fuel nozzle is extended through the aperture and into the fill opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
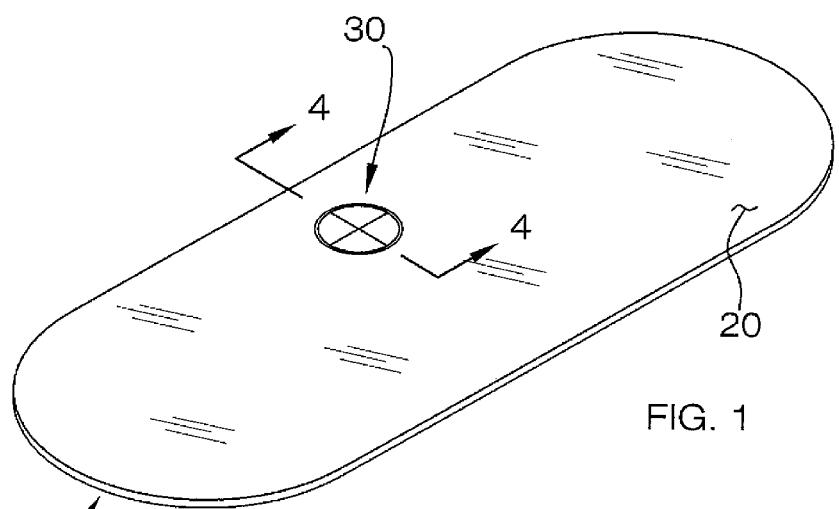
FIG. 1 is a top perspective view of a motorcycle gas tank protecting system according to an embodiment of the disclosure.
Figure 2:
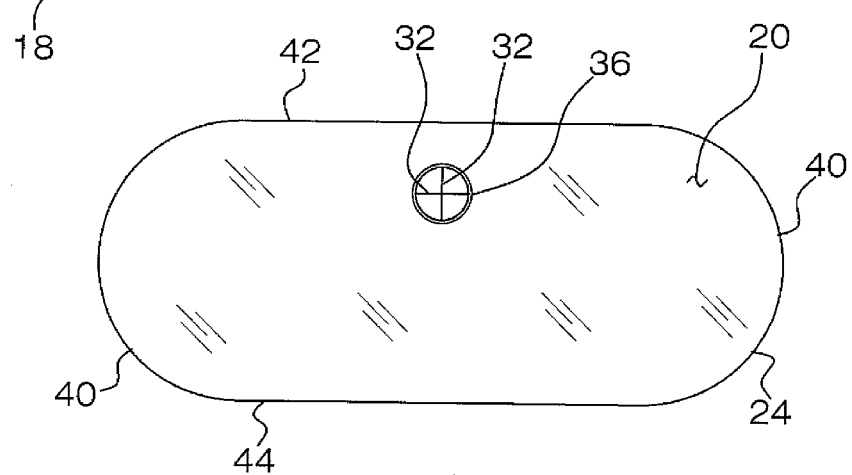
FIG. 2 is a top view of an embodiment of the disclosure.
Figure 3:
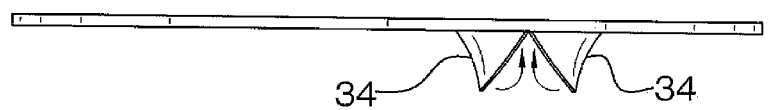
FIG. 3 is a side view of an embodiment of the disclosure.
Figure 4:
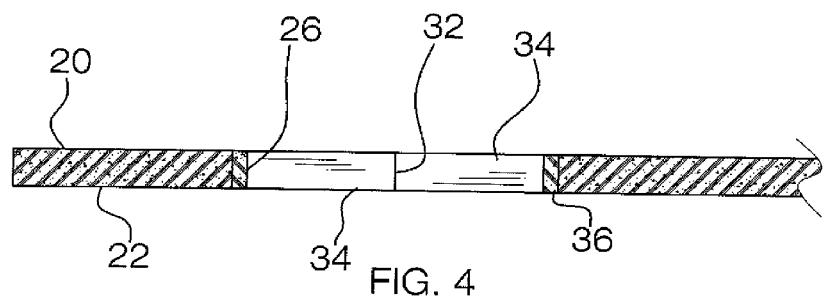
FIG. 4 is a cross-sectional view taken along line 4-4 of FIG. 1 of an embodiment of the disclosure.
Figure 5:
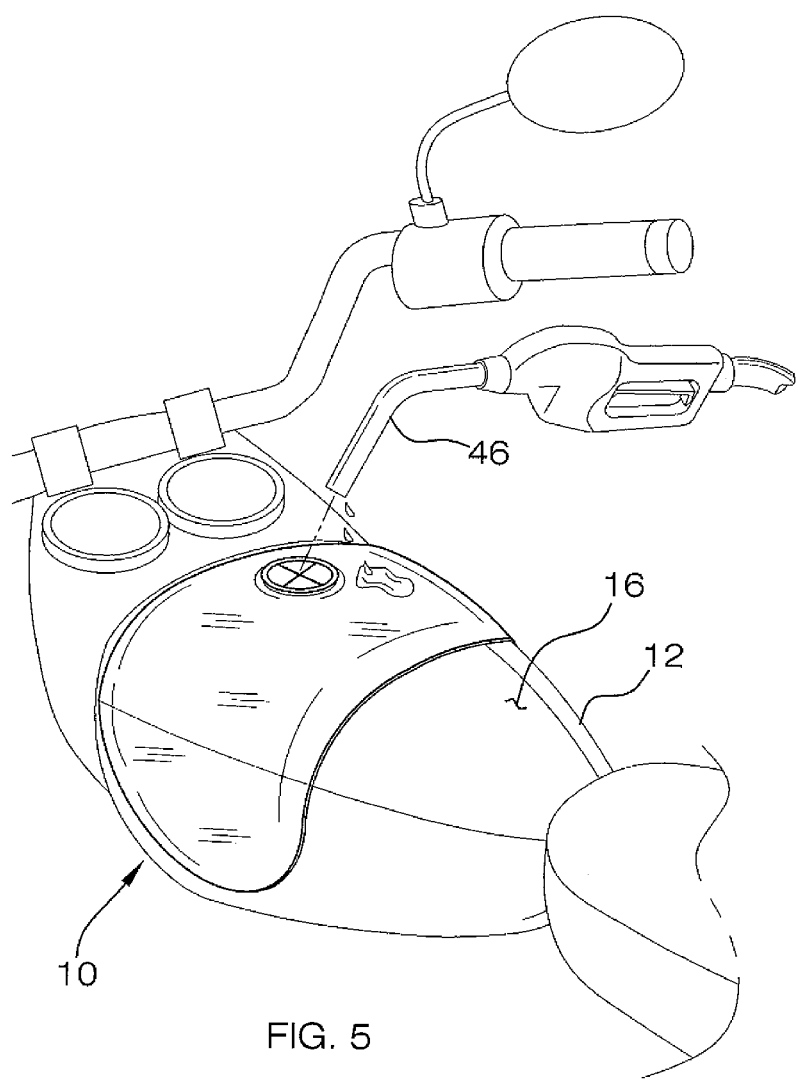
FIG. 5 is an in-use top perspective view of an embodiment of the disclosure.

With reference now to the drawings, and in particular to FIGS. 1 through 7 thereof, a new fuel tank protecting device embodying the principles and concepts of an embodiment of the disclosure and generally designated by the reference numeral 10 will be described.

As best illustrated in FIGS. 1 through 7, the motorcycle gas tank protecting system 10 generally comprises a fuel tank 12 that has a fill opening 14. The fill opening 14 is surrounded by an outer wall 16. The fuel tank 12 will generally comprise a gas tank of a motorcycle and the outer wall 16 will be the outer wall of the motorcycle gas tank itself. However, the system 10 may be used with other vehicles and devices which utilize liquid fuel and the outer wall 16 is the outer wall of the vehicle.

A flexible panel 18 has a top side 20, a bottom side 22 and a perimeter edge 24. The panel 18 has an aperture 26 extending therethrough. The aperture 26 has a size corresponding to a size of the fill opening 14. The panel 18 is transparent and has a thickness from the top side 20 to the bottom side 22 less than ⅓ inch. By being transparent, the panel 18 may be left in place to allow for viewing of the paint on the fuel tank 12, particularly if the panel 18 is retained on the fuel tank 12. The small thickness of the panel 18 allows it to be potentially used with a gas cap 28 since the panel 18 will simply fit between the threads of the gas cap 28 and the fill opening 14. The panel 18 comprises an elastomeric material which adheres to the outer wall due to its static cling properties and which is resiliently bendable.

Figure 6:
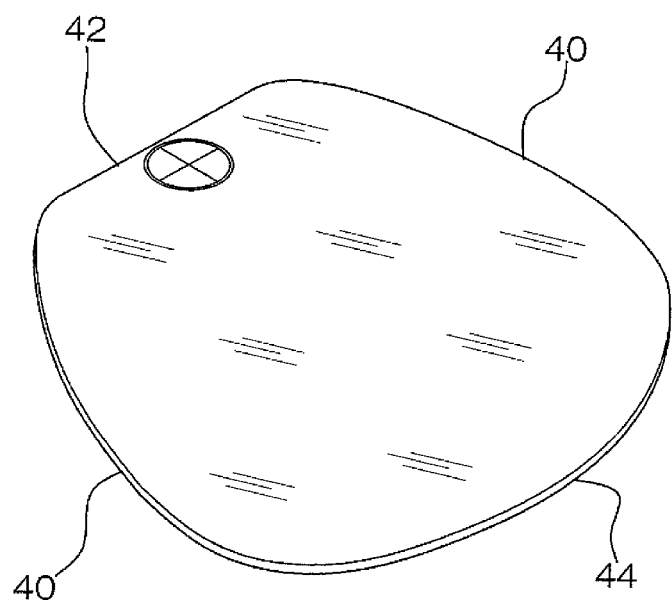
FIG. 6 is a top perspective view of an embodiment of the disclosure.
Figure 7:
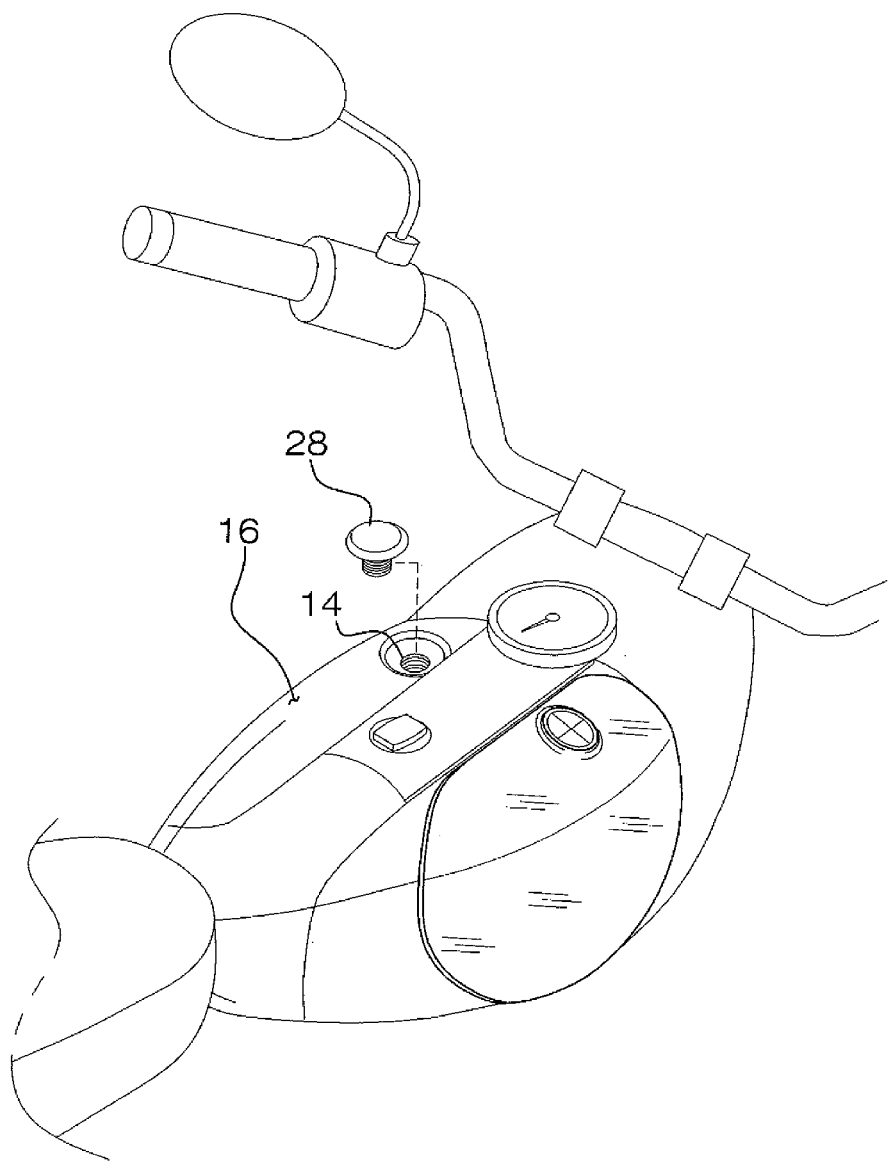
FIG. 7 is an in-use top perspective view of an embodiment of the disclosure.

A covering 30 is attached to the panel 18 and covers the aperture 26. The covering 30 has a plurality of slits 32 therein to allow access through the covering 30. Each of the slits 32 traverses the aperture 26. The plurality of slits 32 is two slits to form four sections 34 in the covering 30. The aperture 26 may be formed by a reinforcing ring 36 attached to the panel 12 and the covering 30 is then attached to the reinforcing ring 36. The reinforcing ring 36 prevents tears in the panel 18 when the areas adjacent to the aperture 26 are contorted to conform to a shape of the fill opening 14. The reinforcing ring 36 also helps to prevent tears should the gas cap also be used with the panel 18. As, shown in FIG. 2, the aperture 26 may be positioned between lateral edges 40 and at least one inch away from a top edge 42 of one embodiment wherein the panel 18 is elongated from lateral edge 40 to the other. FIG. 6 depicts an embodiment wherein the aperture 26 is positioned less than one inch from the top edge 42 and the panel is elongated from the top edge 42 to a bottom edge 44 to accommodate side filling fuel tanks 12. Overall, the panel will generally cover an area of less than four square feet.

In use, the panel 18 is removably positioned on the outer wall 16 and the aperture 26 and aligned with the fill opening 14 to protect the outer wall from fuel when a fuel nozzle 46 is extended through the aperture 26 and into the fill opening 14. The flaps 34 inhibit the escaping of the fuel fumes which are harmful to people and the environment while the panel 18 prevents fires due to electrical discharges between the outer wall 16 and the nozzle 46. If any fuel falls onto the panel 18, it may be wiped away with a cloth but the paint and clear coat of the tank 12 will not be damaged by the fuel spill. Typically, the panel 18 is removed from the gas tank 16 after the tank 16 is filled so that the gas cap 28 can be re-inserted into the fill opening 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A surface protecting system to protect the surface from fuel spillage, said system comprising:

a fuel tank having a fill opening, said fill opening being surrounded by an outer wall;

a flexible panel having a top side, a bottom side and a perimeter edge, said panel having an aperture extending therethrough, said aperture having a size corresponding to a size of said fill opening, said panel being transparent and having a thickness from said top side to said bottom side less than ⅓ inch, said panel comprising an elastomeric material;

a covering being attached to said panel and covering said aperture, said covering having a plurality of slits therein to allow access through said covering, each of said slits traversing said aperture, said plurality of slits being two slits to form four sections in said covering; and said panel being removably positioned on said outer wall and said aperture being aligned with said fill opening to protect said outer wall from fuel when a fuel nozzle is extended through said aperture and into said fill opening.

* * * * *